(12) United States Patent
Liu et al.

(10) Patent No.: US 10,948,686 B2
(45) Date of Patent: Mar. 16, 2021

(54) FIXING BASE AND PROJECTION DEVICE

(71) Applicant: Coretronic Corporation, Hsin-Chu (TW)

(72) Inventors: Kuang-Yao Liu, Hsin-Chu (TW); Tsan-Fu Tseng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/744,199

(22) Filed: Jan. 16, 2020

(65) Prior Publication Data
US 2020/0249416 A1    Aug. 6, 2020

(30) Foreign Application Priority Data
Jan. 31, 2019  (CN) .......................... 201910098640.3

(51) Int. Cl.
*G03B 21/14*  (2006.01)
*G02B 7/02*   (2021.01)
*G03B 21/28*  (2006.01)
*G03B 21/20*  (2006.01)

(52) U.S. Cl.
CPC ........... *G02B 7/026* (2013.01); *G03B 21/142* (2013.01); *G03B 21/145* (2013.01); *G03B 21/208* (2013.01); *G03B 21/28* (2013.01)

(58) Field of Classification Search
CPC .. G03B 21/005; G03B 21/006; G03B 21/008; G03B 21/28; G03B 21/142; G03B 21/145; G03B 21/208; G02B 7/02; G02B 7/022; G02B 7/026; G02B 7/04; G02B 7/09
See application file for complete search history.

(56) References Cited

U.S. PATENT DOCUMENTS 6,639,741 B2   10/2003  Wagner
2019/0137853 A1*  5/2019  Takehana ............... G02B 7/021

\* cited by examiner

*Primary Examiner* — Sultan Chowdhury (57) ABSTRACT

A fixing base for fixing an optical element and disposing at least two elastic members is provided. The fixing base includes a fixing groove and an elastic member fixing groove. The elastic members abut against the elastic member fixing groove to provide the elastic members with a push force toward the optical element, so that the optical element abuts against the fixing groove. An opening direction of the fixing groove and an opening direction of the elastic member fixing groove are nonparallel to the optical axis of the optical element, and the elastic members and the optical element are respectively disposed in the elastic member fixing groove and the fixing groove along a direction nonparallel to the optical axis. The invention also provides a projection device including the fixing base. The fixing base provided by the invention can accurately and easily fix the optical element.

20 Claims, 7 Drawing Sheets

FIXING BASE AND PROJECTION DEVICE

CROSS-REFERENCE TO RELATED APPLICATION

This application claims the priority benefit of China application (CN201910098640.3), filed on Jan. 31, 2019. The entirety of the above-mentioned patent application is hereby incorporated by reference herein and made a part of this specification.

FIELD OF THE INVENTION

The invention relates to a fixing base, and more particularly to a fixing base that can fix an optical element in projection device.

BACKGROUND OF THE INVENTION

It is often required to dispose and fix various optical elements in various existing optical devices or apparatus. In the prior art, a fixing base is generally disposed in the device to fix an optical element (e.g., a lens, a mirror, a filter) to the device.

However, the shape or the thickness of the lens often does not completely fit the fixing base due to the manufacturing tolerance. Therefore, problems such as displacement or tilt of the optical element may occur when the optical device or apparatus is subjected to vibration.

Further, additional components such as screws are often needed to fix the optical element fixing base, and the optical device or apparatus is designed to be stacked and assembled along the direction of the optical axis. Thus, not only having high assembly complexity, but also the component cost and assembly time are increased. Therefore, how to make the fixing base accurately and easily fix the optical element is a focus of attention of those skilled in the art.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a fixing base capable of accurately and easily fixing an optical element.

The invention further provides a projection device capable of accurately and easily fixing an optical element.

Other advantages and objects of the invention may be further illustrated by the technical features broadly embodied and described as follows.

In order to achieve one or a part of or all of the objects or other objects, an embodiment of the invention provides a fixing base for fixing an optical element and disposing at least two elastic members. The optical element includes an optical axis. The fixing base includes a fixing groove and an elastic member fixing groove. The fixing groove is configured to dispose the optical element. The fixing groove includes a first end, a second end, and an abutting surface. The fixing groove is formed by extending from the first end to the second end. The elastic member fixing groove is formed by extending from a first fixing end to a second fixing end. Each of the at least two elastic members includes an urging part and a supporting part. The supporting part abuts against an inner surface of the elastic member fixing groove to provide the urging part with a push force toward the optical element, so that the optical element abuts against the abutting surface. An opening direction of the fixing groove and an opening direction of the elastic member fixing groove are nonparallel to a direction of the optical axis, and the at least two elastic members and the optical element are respectively disposed in the elastic member fixing groove and the fixing groove along a direction nonparallel to the direction of the optical axis.

In order to achieve one or a part of or all of the objects or other objects, an embodiment of the invention provides a projection device. The projection device includes an illumination system, a light combining element, a light valve and a projection lens. The light combining element includes at least one optical element, at least two elastic members and at least one fixing base. The fixing base includes a fixing groove and an elastic member fixing groove. The fixing groove is configured to dispose the optical element. The fixing groove includes a first end, a second end, and an abutting surface. The fixing groove is formed by extending from the first end to the second end. The elastic member fixing groove is formed by extending from a first fixing end to a second fixing end. Each of the at least two elastic members includes an urging part and a supporting part. The supporting part abuts against an inner surface of the elastic member fixing groove to provide the urging part with a push force toward the optical element, so that the optical element abuts against the abutting surface. An opening direction of the fixing groove and an opening direction of the elastic member fixing groove are nonparallel to a direction of the optical axis, and the at least two elastic members and the optical element are respectively disposed in the elastic member fixing groove and the fixing groove along a direction nonparallel to the direction of the optical axis. The illumination system is used for providing an illumination beam. The light combining element is disposed on a transmission path of the illumination beam so that the illumination beam passes through the light combining element. The light valve is used for forming an image beam. The projection lens is disposed on a transmission path of the image beam.

The fixing base of the embodiment of the invention can accurately and conveniently fix the optical element by providing the fixing groove, the elastic member fixing groove and the at least two elastic members. Not only the optical element can be accurately and quickly disposed in the desired assembly position, but also prevent problems such as tilt or displacement of the optical element.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
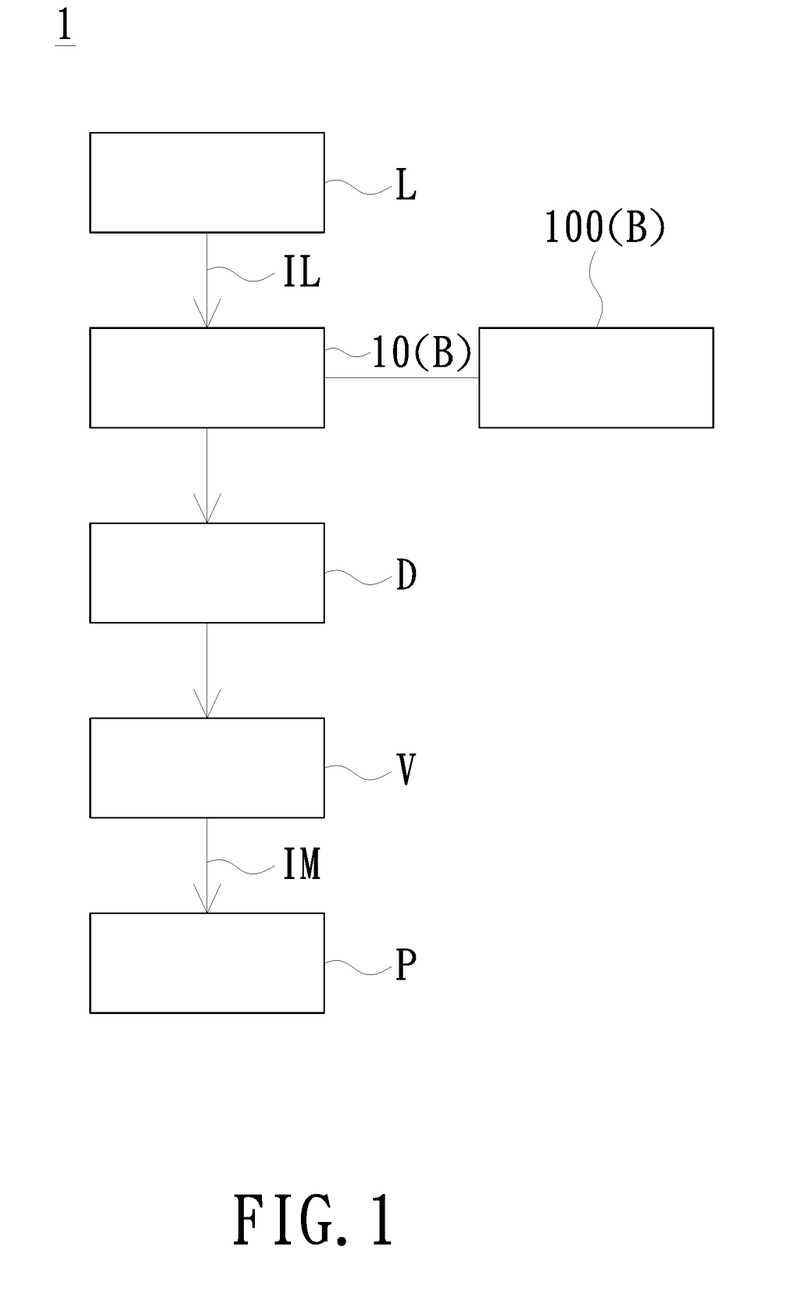
FIG. 1 is a schematic diagram of a projection device according to an embodiment of the invention.

Please refer to FIG. 1. FIG. 1 is a schematic diagram of a projection device according to an embodiment of the invention. The projection device 1 includes an illumination system L, a light combining element B, a wavelength converting element D, a light valve V and a projection lens P. The light combining element B includes at least one fixing base 100, at least one optical element 10 and at least two elastic members (not shown). The fixing base 100 is used for fixing the optical element 10. The optical element 10 is, for example, a lens, a mirror or a filter. The filter selects a part of light with a first wavelength range to transmit and the other part of light with a second wavelength range to reflect or absorb. The light combining element B and the wavelength converting element D are disposed on the transmission path of the illumination beam IL provided by the illumination system L, so that the illumination beam IL sequentially passes through the light combining element B and the wavelength converting element D. The wavelength converting element D is used for adjusting the color or wavelength of the illumination beam IL passing through the light combining element B. The light valve V converts the illumination beam IL adjusted by the wavelength converting element D into the image beam IM. In other words, the light valve V is used for forming the image beam IM. The projection lens P is disposed on the transmission path of the image beam IM and is used for projecting the image beam IM onto a projection surface to form an image frame. The quantity of the wavelength converting element D is exemplified by one in FIG. 1; however, in other embodiments, the quantity of the wavelength converting element D may be plural, for example, including a phosphor wheel and a filter wheel. The illumination system L may include, for example, a high pressure mercury lamp, a laser diode (LD), or a light-emitting diode (LED) to generate the illumination beam IL, but the invention is not limited thereto. It is noted that the light combining element B including the at least one fixing base 100 and the at least one optical element 10 may be disposed in the illumination system L, or may be disposed between the wavelength converting element D and the light valve V.

In the embodiment, the optical element 10 of the projection device 1 is exemplified by being disposed on the fixing base 100. By providing the fixing base 100, the assembly of the projection device 1 can be more accurate, faster and more convenient. The specific operational details will be described below.

Figure 2:
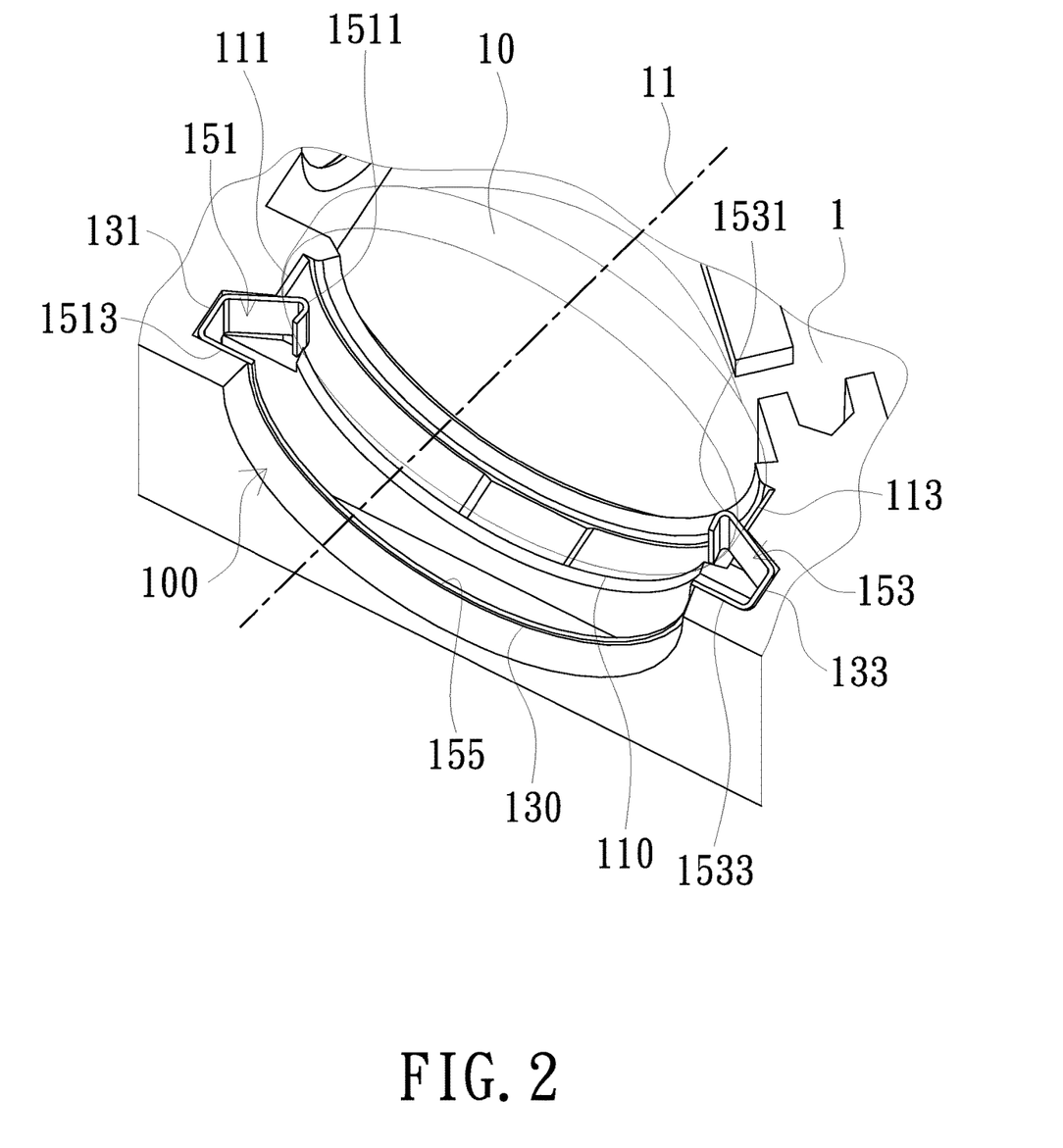
FIG. 2 is a schematic diagram of a fixing base according to an embodiment of the invention.
Figure 3:
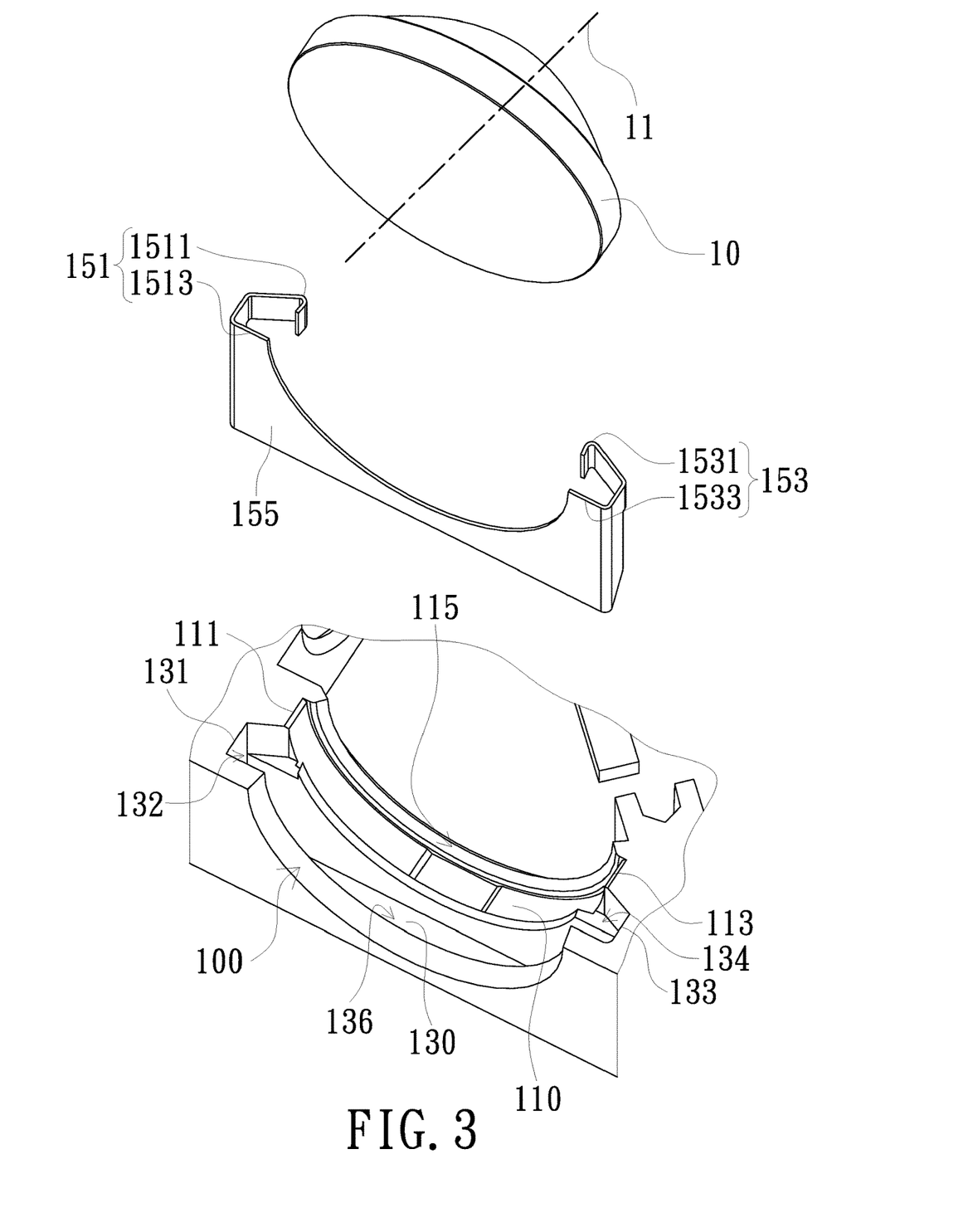
FIG. 3 is a schematic exploded view of a fixing base according to an embodiment of the invention.

To facilitate the following description, please refer to FIG. 2 and FIG. 3 together. FIG. 2 is a schematic diagram of a fixing base 100 according to an embodiment of the invention. FIG. 3 is a schematic exploded view of the fixing base 100 shown in FIG. 2. As shown in FIG. 2, the fixing base 100 is used for fixing the optical element 10 and for disposing the elastic members 151 and 153, and the optical element 10 includes an optical axis 11. The fixing base 100 includes a fixing groove 110 and an elastic member fixing groove 130. The fixing groove 110 is used for disposing the optical element 10. The fixing groove 110 includes a first end 111, a second end 113, and an abutting surface 115. The fixing groove 110 is formed by extending from the first end 111 to the second end 113, and the first end 111 is not connected to the second end 113. The elastic member fixing groove 130 is formed by extending from a first fixing end 131 to a second fixing end 133. The elastic members 151 and 153 can be inserted into the elastic member fixing groove 130. The elastic member 151 includes an urging part 1511 and a supporting part 1513 connected to the urging part 1511 through a connecting arm (not shown). The elastic member 153 includes an urging part 1531 and a supporting part 1533 connected to the urging part 1531 through a connecting arm (not shown). The supporting parts 1513 and 1533 abut against an inner surface of the elastic member fixing groove 130 to respectively provide the urging parts 1511 and 1531 with push forces (not shown) toward the optical element 10, so that the optical element 10 abuts against the abutting surface 115. An opening direction of the fixing groove 110 and an opening direction of the elastic member fixing groove 130 are both nonparallel to a direction of the optical axis 11, and the elastic members 151 and 153 and the optical element 10 are respectively disposed in the elastic member fixing groove 130 and the fixing groove 110 along a direction nonparallel to the direction of the optical axis 11.

The urging parts 1511 and 1531 of the elastic members 151 and 153 elastically push against the optical element 10 when the optical element 10 is disposed in the fixing groove 110 and the elastic members 151 and 153 are disposed in the elastic member fixing groove 130, so that a part of the optical element 10 abuts against the abutting surface 115. In an embodiment, the normal direction of the tangent plane at any point on the abutting surface 115 of the fixing groove 110 may not be perpendicular to the optical axis 11 of the optical element 10.

Therefore, the optical element 10 can be accurately and conveniently disposed on the fixing base 100 by providing the fixing groove 110, the elastic member fixing groove 130, and the elastic members 151 and 153. Specifically, a part of the optical element 10 can abut against the abutting surface 115 by the urging parts 1511 and 1531 of the elastic members 151 and 153 elastically pushing against the optical element 10, and thus the optical element 10 can be accurately disposed at a desired assembly position and problems such as tilt or displacement of the optical element 10 can be avoided.

In detail, when the elastic members 151 and 153 are disposed in the elastic member fixing groove 130, the elastic members 151 and 153 are partially disposed in the elastic member fixing groove 130, and the supporting parts 1513 and 1533 respectively abut against the inner surfaces of the first fixing end 131 and the second fixing end 133 of the elastic member fixing groove 130 to respectively provide the urging parts 1511 and 1531 with a push force toward the optical element 10, so that the optical element 10 abuts against the abutting surface 115.

The invention does not limit the shape and form of the abutting surface 115 of the fixing groove 110 as long as the abutting surface 115 of the fixing groove 110 may be a curved surface that matches with the shape of the optical element 10. Any configuration in which the shape of the abutting surface 115 of the fixing groove 110 may match with the shape of the optical element 10 is within the scope of the invention. The abutting surface 115 is attached to and abutted against a surface of the optical element 10 opposite to the elastic members 151 and 153, so that a part of the optical element 10 can be more firmly attached when it abuts against the abutting surface 115. In an embodiment, the abutting surface 115 abutting against the surface of the optical element 10 may be formed by extending from the first end 111 to the second end 113 of the fixing groove 110, and the abutting surface 115 abuts against a part of the periphery of the surface of the optical element 10; as such, the optical element 10 may be provided with a larger abutting surface to enhance the stability.

In detail, the first fixing end 131 and the second fixing end 133 are respectively located at two end sides of the elastic member fixing groove 130, and the first fixing end 131 is not connected to the second fixing end 133. In the embodiment, the elastic members 151 and 153 are respectively located at the first fixing end 131 and the second fixing end 133 of the elastic member fixing groove 130, that is, the elastic members 151 and 153 are respectively located at the two end sides of the elastic member fixing groove 130. The elastic members 151 and 153 located at the two end sides of the elastic member fixing groove 130 allow a part of the optical element 10 to firmly abut against the abutting surface 115 of the fixing groove 110.

In addition, a connecting member 155 is disposed between the elastic members 151 and 153. In the embodiment, the elastic members 151 and 153 and the connecting member 155 are integrally formed, but the invention is not limited thereto. The connecting member 155 is also disposed in the elastic member fixing groove 130. The assembly efficiency of the fixing base 100 can be greatly improved and the cost thereof can be reduced by providing the integrally formed elastic members 151 and 153 and the connecting member 155. The integrally formed elastic members 151 and 153 and the connecting member 155 may include, for example, metal material, but the invention is not limited thereto. The structure and form of the elastic members 151 and 153 and the connecting member 155 shown in FIG. 2 and FIG. 3 are merely exemplary and are not intended to limit the invention. Configuring the elastic members 151 and 153 to include the supporting parts 1513 and 1533 for supporting and the urging parts 1511 and 1531 for pushing to generate elastic and pushing force is a common knowledge in the mechanical field, and no redundant detail is to be given herein.

As shown in FIG. 3, the elastic member fixing groove 130 may further include, for example, a first fixing groove 132 and a second fixing groove 134. The first fixing groove 132 and the second fixing groove 134 are respectively located at the two end sides of the elastic member fixing groove 130. As shown in FIG. 2, the elastic members 151 and 153 may be respectively disposed in the first fixing groove 132 and the second fixing groove 134. In the embodiment, the elastic member fixing groove 130 can fix the elastic members 151 and 153 more stably by providing the first fixing groove 132 and the second fixing groove 134 having a structure similar to that of the elastic members 151 and 153.

In addition, the elastic member fixing groove 130 may further include, for example, a connecting groove 136. The connecting groove 136 is disposed between the first fixing groove 132 and the second fixing groove 134. The connecting member 155 is disposed in the connecting groove 136. The elastic members 151 and 153 and the connecting member 155 integrally formed or joined in any means can be conveniently and stably disposed in the elastic member fixing groove 130 by providing the elastic member fixing groove 130 with the first fixing groove 132, the second fixing groove 134 and the connecting groove 136, thereby significantly improving the assembly reliability and efficiency of the fixing base 100 and reducing the cost thereof.

Incidentally, the fixing groove 110 and the elastic member fixing groove 130 of the fixing base 100 may be, for example, integrally formed, but the invention is not limited thereto. The integrally formed fixing groove 110 and the elastic member fixing groove 130 can improve the assembly reliability and accuracy of the fixing base 100 and reduce the cost thereof.

Figure 4:
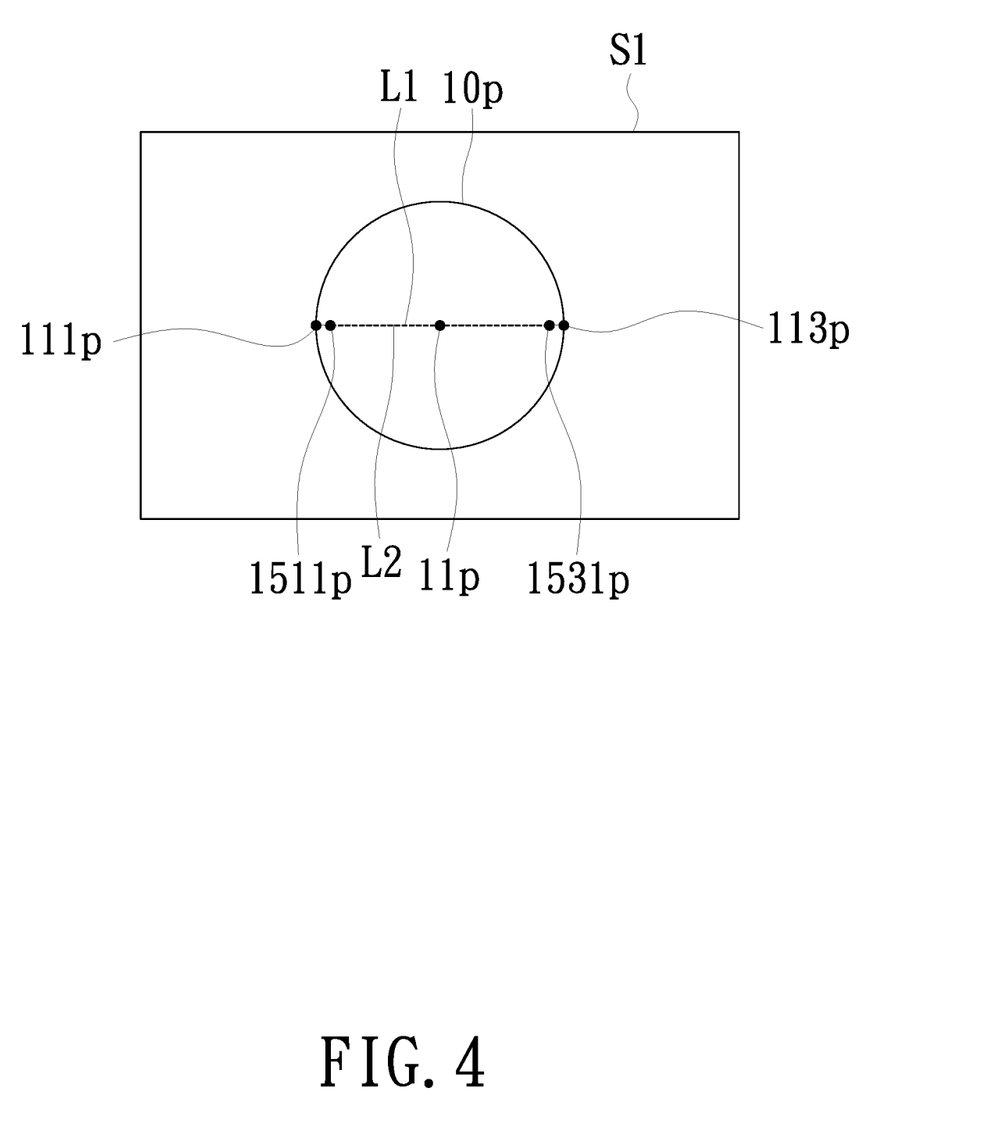
FIG. 4 is a schematic diagram of the relative positional relationship of elements of a fixing base according to an embodiment of the invention.

Please also refer to FIG. 4. FIG. 4 is a schematic diagram of the relative positional relationship of elements of the fixing base 100 shown in FIG. 2. The fixing base 100 may also include a reference surface S1. The reference surface S1 is perpendicular to the optical axis 11 of the optical element 10, that is, the normal direction of the reference surface S1 is parallel to the optical axis 11 of the optical element 10. The orthographic projection images of the first end 111 and the second end 113 of the fixing groove 110 respectively on the reference surface S1 are images 111p and 113p. The orthographic projection image of the optical element 10 on the reference surface S1 is an image 10p. The orthographic projection image of the center of the optical element 10 on the reference surface S1 is an image 11p. In the embodiment, the line L1 connecting the orthographic projection images 111p and 113p of the first end 111 and the second end 113 on the reference surface S1 passes through the orthographic projection image 11p of the center of the optical element 10 on the reference surface S1, but the invention is not limited thereto. In an embodiment, the elastic members 151 and 153 can firmly elastically push against the optical element 10 by providing the fixing groove 110 in which the line L1 connecting the orthographic projection images 111p and 113p passes through the image 11p, and therefore, problems such as tilt or displacement are effectively avoided.

In other embodiments of the invention, the line connecting the orthographic projection images of the first end 111 and the second end 113 of the fixing groove may be, for example, slightly higher or lower than the orthographic projection image 11p of the center of the optical element 10 on the reference surface S1, thereby achieving different fixing effects.

In addition, the orthographic projection image of the urging part 1511 of the elastic member 151 on the reference surface S1 is an image 1511p. The orthographic projection image of the urging part 1531 of the elastic member 153 on the reference surface S1 is an image 1531p. In the embodiment, the line L2 connecting the orthographic projection images 1511p and 1531p of the urging parts 1511 and 1531 on the reference surface S1 passes through the orthographic projection image 11p of the center of the optical element 10 on the reference surface S1. In the invention, the elastic members 151 and 153 can more firmly elastically push against the optical element 10 by configuring the line L2 connecting the orthographic projection images 1511p and 1531p of the urging parts 1511 and 1513 of the elastic members 151 and 153 on the reference surface S1 to pass through the orthographic projection image 11p on the reference surface S1 and the line L2 connecting the orthographic projection images on the reference surface S1 to pass through the center of the orthographic projection image 11p of the optical element 10 on the reference surface S1, and therefore, problems such as tilt or displacement are effectively avoided. In other embodiments of the invention, the line L2 connecting the orthographic projection images 1511p and 1531p of the urging parts 1511 and 1531 of the elastic members 151 and 153 on the reference surface S1 may be, for example, slightly higher or lower than the orthographic projection image 11p of the center of the optical element 10 on the reference surface S1, thereby achieving different fixing effects.

Figure 5A:
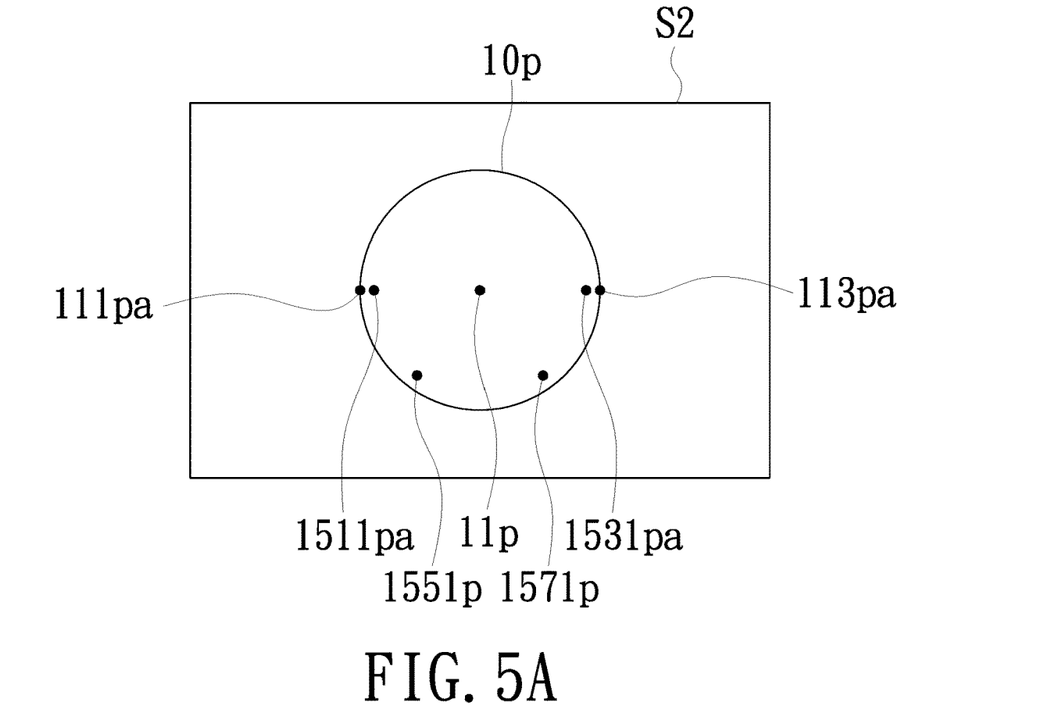
FIG. 5A is a schematic diagram of the relative positional relationship of elements of a fixing base according to another embodiment of the invention.

Please refer to FIG. 5A. FIG. 5A is a schematic diagram of the relative positional relationship of elements of a fixing base according to another embodiment of the invention. The fixing base of this embodiment is similar in structure and function to the fixing base 100 shown in FIG. 1 to FIG. 4. To facilitate the following description, this embodiment does not show the schematic diagram of the fixing base but using the reference surface S2 to describe the relative positional relationship of elements instead. The difference between this embodiment and the embodiments shown in FIG. 1 to FIG. 4 is that the fixing base (not shown) of this embodiment includes four elastic members, and the four elastic members are evenly distributed in the elastic member fixing groove.

In the embodiment, the reference surface S2 is perpendicular to the optical axis 11 of the optical element 10. The orthographic projection images of the first end and the second end of the fixing groove respectively on the reference surface S2 are images 111pa and 113pa. The orthographic projection image of the optical element 10 on the reference surface S2 is the image 10p. The orthographic projection image of the center of the optical element 10 on the reference surface S2 is the image 11p. The orthographic projection images of the urging parts of the four elastic members of the embodiment on the reference surface S2 are images 1511pa, 1531pa, 1551p, and 1571p respectively. The four elastic members can effectively firmly push against the optical member 10 by configuring the four elastic members to be equally distributed in the elastic member fixing groove.

It should be noted that the embodiment shown in FIG. 1 to FIG. 4 is exemplified by two elastic members 151 and 153, and the embodiment shown in FIG. 5A is exemplified by four elastic members, but the invention is not limited thereto. In other embodiments of the invention, the fixing base may include, for example, three or more elastic members to effectively push against the optical element disposed on the fixing base. In addition, the elastic members can firmly push against the optical element when the plurality of elastic members is evenly distributed in the elastic member fixing groove.

Figure 5B:
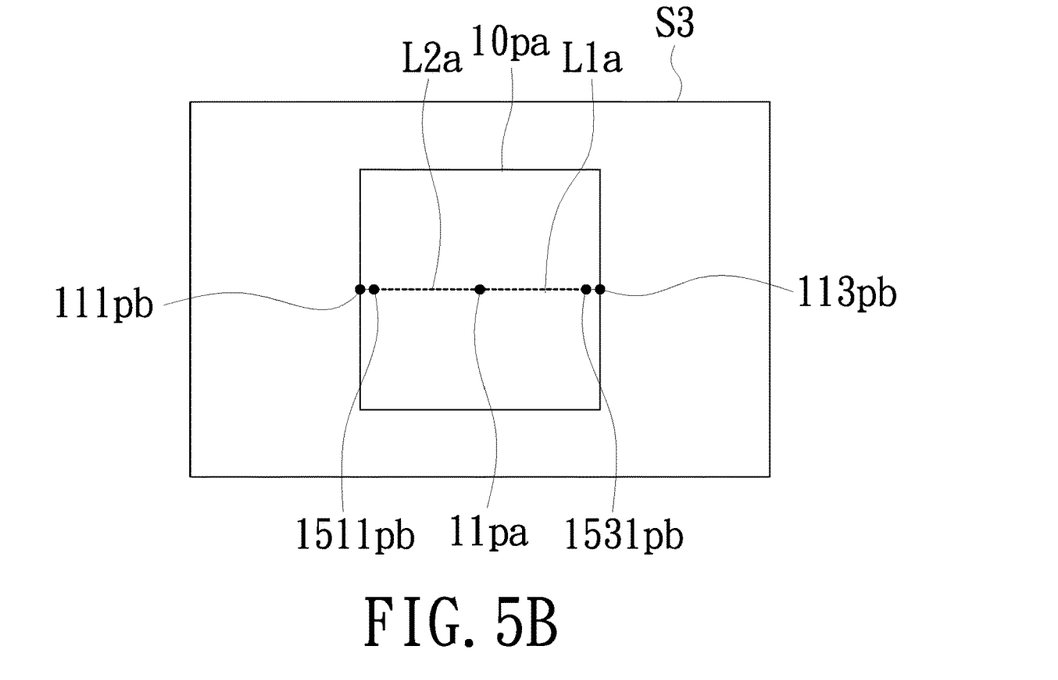
FIG. 5B is a schematic diagram of the relative positional relationship of elements of a fixing base according to still another embodiment of the invention.

Please refer to FIG. 5B. FIG. 5B is a schematic diagram of the relative positional relationship of elements of a fixing base according to still another embodiment of the invention. The fixing base of this embodiment is similar in structure and function to the fixing base 100 shown in FIG. 1 to FIG. 4. To facilitate the following description, this embodiment does not show the schematic diagram of the fixing base, but using the reference surface S3 to describe relative positional relationship of elements instead. The difference between this embodiment and the embodiment shown in FIG. 1 to FIG. 4 is that the optical element (not shown) on the fixing base (not shown) of this embodiment is exemplified by a square.

In the embodiment, the reference surface S3 is perpendicular to the optical axis of the optical element. The orthographic projection images of the first end and the second end of the fixing groove respectively on the reference surface S3 are images 111pb and 113pb. The orthographic projection image of the optical element on the reference surface S3 is an image 10pa. The orthographic projection image of the center of the optical element on the reference surface S3 is an image 11pa. The orthographic projection images of the urging parts of the two elastic members of the embodiment respectively on the reference surface S3 are images 1511pb and 1531pb. In the embodiment, the line L1a connecting the orthographic projection images 111pb and 113pb of the first end and the second end of the fixing groove on the reference surface S3 passes through the orthographic projection image 11pa of the center of the optical element on the reference surface S3. The line L2a connecting the orthographic projection images 1511pb and 1531pb of the urging parts of the two elastic members on the reference surface S3 passes through the orthographic projection image 11pa of the center of the optical element the on the reference surface S3. Therefore, the fixing base of the embodiment can firmly and accurately fix the square optical element.

In addition, in the embodiment, the shapes of the fixing groove and the elastic member fixing groove of the fixing base may match with the shape of the square optical element, so that the optical element is stably disposed in the fixing groove. The fixing groove 110 and the elastic member fixing groove 130 of the fixing base 100 shown in FIG. 1 to FIG. 4 may be semicircular as viewing along the direction of the optical axis 11, so as to fix the circular optical element 10. In the embodiment shown in FIG. 5B, the fixing groove and the elastic member fixing groove of the fixing base may be square as viewing along the direction of the optical axis, so as to fix the square optical element. Configuring the shapes of the fixing groove and the elastic member fixing groove of the fixing base to match with the shape of the optical element to dispose the optical element is a simple variation of the invention, as such, the embodiment shown in FIG. 5B is not illustrated in detail.

The fixing base 100 shown in FIG. 1 to FIG. 4 for fixing the circular optical element 10 and the fixing base shown in FIG. 5B for fixing the square optical element are for illustrative purposes only. In other embodiments of the invention, the optical element fixed to the fixing base can be any shape. Also, the invention does not limit the type of the optical element, and the optical element may be any possible elements, for example, a lens, a mirror or a filter.

Figure 6A:
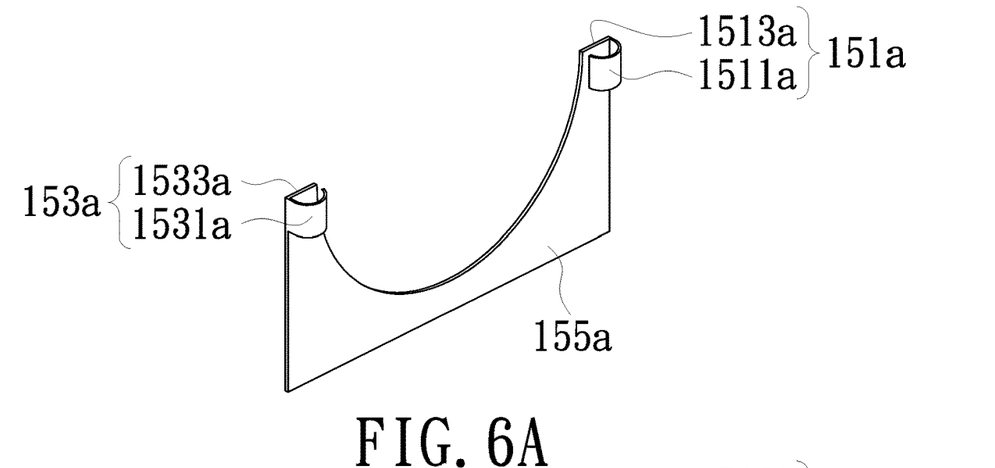
FIG. 6A is a schematic diagram of an elastic member of a fixing base according to another embodiment of the invention.
Figure 6B:
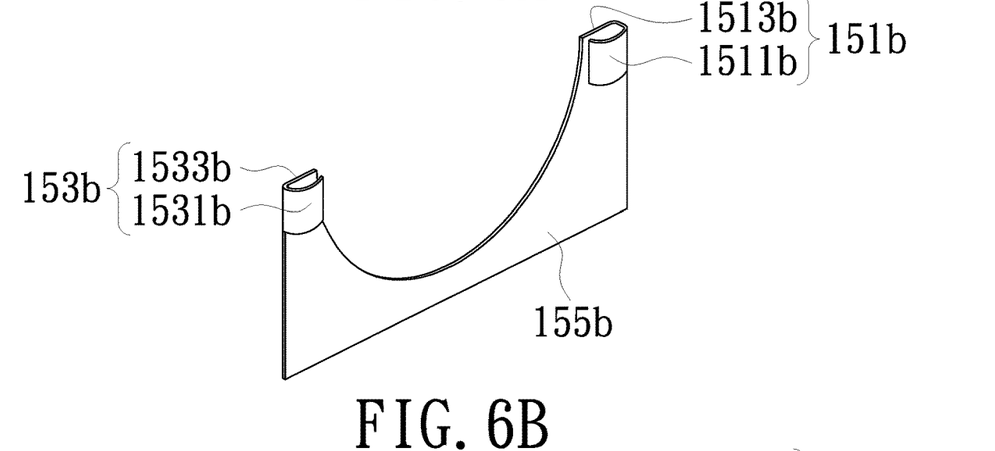
FIG. 6B is a schematic diagram of an elastic member of a fixing base according to still another embodiment of the invention.
Figure 6C:
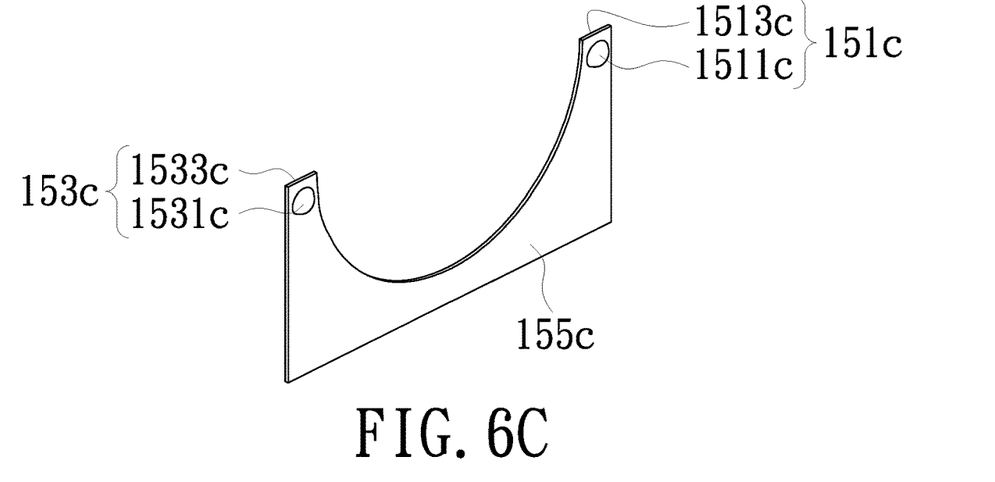
FIG. 6C is a schematic diagram of an elastic member of a fixing base according to yet another embodiment of the invention.

Please refer to FIG. 6A to FIG. 6C. FIG. 6A to FIG. 6C are schematic diagrams of possible variations of the elastic members 151 and 153 and the connecting member 155 shown in FIG. 1 to FIG. 4. In the embodiment shown in FIG. 6A, the elastic member 151a includes an urging part 1511a and a supporting part 1513a, the elastic member 153a includes an urging part 1531a and a supporting part 1533a and the elastic member 151a and the elastic member 153a are connected to each other by a connecting member 155a. In the embodiment, the structure of the elastic member 151a forming the urging part 1511a and the structure of the elastic member 153a forming the urging part 1531a have a semicircular shape, as viewed from the top to bottom of FIG. 6A.

In the embodiment shown in FIG. 6B, the elastic member 151b includes an urging part 1511b and a supporting part 1513b, the elastic member 153b includes an urging part 1531b and a supporting part 1533b, and the elastic member 151b and the elastic member 153b are connected to each other by a connecting member 155b. In the embodiment, the structure of the elastic member 151b forming the urging part 1511b and the structure of the elastic member 153b forming the urging part 1531b have an arc shape, as viewed from the top to bottom of FIG. 6B.

In the embodiment shown in FIG. 6C, the elastic member 151c includes an urging part 1511c and a supporting part 1513c, the elastic member 153c includes an urging part 1531c and a supporting part 1533, and the elastic member 151c and the elastic member 153c are connected to each other by a connecting member 155c. In the embodiment, the structure of the elastic member 151c forming the urging part 1511c is a hemispherical structure bulging from the supporting part 1513c, and the structure of the elastic member 153c forming the urging part 1531c is a hemispherical structure bulging from the supporting part 1533c. The structure and form of the elastic members and the connecting members of the embodiment shown in FIG. 6A to FIG. 6C are merely illustrative and are not intended to limit the invention. Any configuration in which the elastic member includes a supporting part that can be fixed into the elastic member fixing groove and an urging part that can be used for elastically pushing against the optical member is within the scope of the invention.

Figure 7:
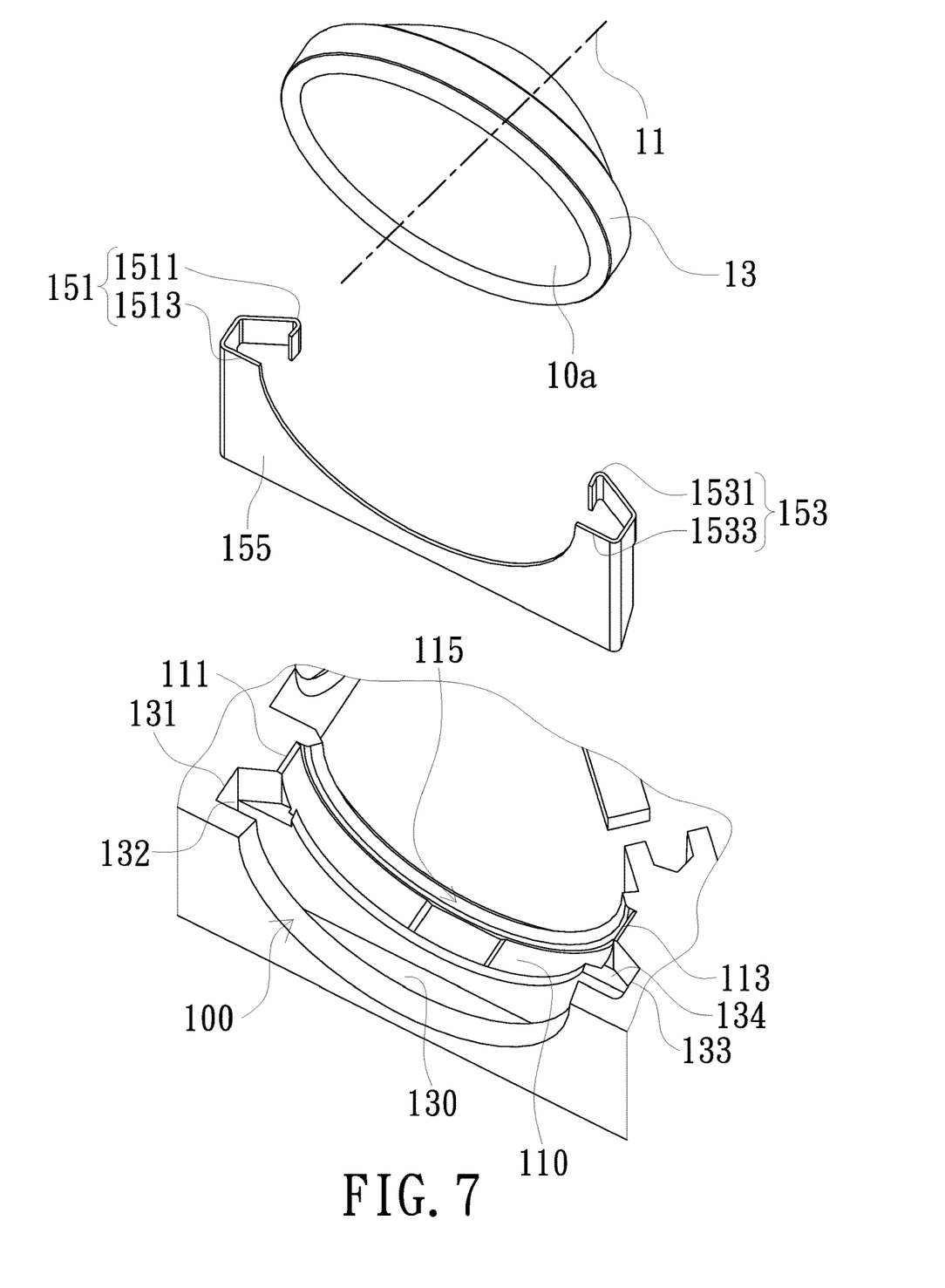
FIG. 7 is a schematic exploded view of a fixing base according to another embodiment of the invention.

Please refer to FIG. 7. FIG. 7 is a schematic exploded view of a fixing base according to another embodiment of the invention. The fixing base 100 of the embodiment is the same as the fixing base 100 shown in FIG. 1 to FIG. 4. The difference between this embodiment and the embodiment shown in FIG. 1 to FIG. 4 is mainly that the periphery of the optical element 10a further includes a convex edge 13. The urging parts 1511 and 1531 of the elastic members 151 and 153 can elastically push against the convex edge 13 of the optical element 10a when the optical element 10a is disposed in the fixing groove 110 (not shown), so that the convex edge 13 of a part of the optical element 10a abuts against the abutting surface 115 of the fixing groove 110. The fixing base 100 of the embodiment can accurately and conveniently fix the optical element including the convex edge 13.

In summary, the fixing base of the embodiments of the invention can accurately and conveniently fix the optical element by providing the fixing groove, the elastic member fixing groove and the at least two elastic members. As such, not only the optical element can be accurately and quickly disposed at the desired assembly position, but also problems such as tilt or displacement of the optical element can be avoided.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first end, the second end, the first fixing end, the second fixing end, the first fixing groove and the second fixing groove are only used for distinguishing various elements and do not limit the number of the elements.

What is claimed is:

1. A fixing base for fixing an optical element and disposing at least two elastic members, the optical element comprising an optical axis, and the fixing base comprising a fixing groove and an elastic member fixing groove, wherein:
the fixing groove is configured to dispose the optical element, the fixing groove comprises a first end, a second end, and an abutting surface, and the fixing groove is formed by extending from the first end to the second end; and
the elastic member fixing groove is formed by extending from a first fixing end to a second fixing end,
wherein each of the at least two elastic members comprises an urging part and a supporting part, the supporting part abuts against an inner surface of the elastic member fixing groove to provide the urging part with a push force toward the optical element, so that the optical element abuts against the abutting surface,
wherein an opening direction of the fixing groove and an opening direction of the elastic member fixing groove are nonparallel to a direction of the optical axis, and the at least two elastic members and the optical element are respectively disposed in the elastic member fixing groove and the fixing groove along a direction nonparallel to the direction of the optical axis.

2. The fixing base according to claim 1, wherein when the at least two elastic members are disposed in the elastic member fixing groove, the at least two elastic members are partially disposed in the elastic member fixing groove and the supporting parts thereof respectively abut against inner surfaces of the first fixing end and the second fixing end of the elastic member fixing groove, thereby providing the urging part with the push force toward the optical element, so that the optical element abuts against the abutting surface.

3. The fixing base according to claim 2, wherein the abutting surface is a curved surface and attaches and abuts against a surface of the optical element opposite to the at least two elastic members.

4. The fixing base according to claim 3, wherein a connecting member is disposed between the at least two elastic members, the at least two elastic members and the connecting member are integrally formed, and the connecting member is disposed in the elastic member fixing groove.

5. The fixing base according to claim 1, wherein the elastic member fixing groove further comprises a first fixing groove and a second fixing groove, the first fixing groove and the second fixing groove are respectively located at two end sides of the elastic member fixing groove, a quantity of the at least two elastic members is two, and the two elastic members are respectively disposed in the first fixing groove and the second fixing groove.

6. The fixing base according to claim 1, wherein a connecting member is disposed between the at least two elastic members, the elastic member fixing groove further comprises a connecting groove, the connecting groove is disposed between the first fixing groove and the second fixing groove, and the connecting member is disposed in the connecting groove.

7. The fixing base according to claim 1, further comprising a reference surface, wherein the reference surface is perpendicular to the optical axis, a line connecting orthographic projection images of the urging parts of the at least two elastic members on the reference surface passes through a center of an orthographic projection image of the optical element on the reference surface.

8. The fixing base according to claim 7, wherein a line connecting orthographic projection images of the first end and the second end on the reference surface passes through the center of the orthographic projection image of the optical element on the reference surface.

9. The fixing base according to claim 1, wherein the at least two elastic members are evenly distributed in the elastic member fixing groove.

10. The fixing base according to claim 1, wherein the optical element comprises a convex edge, and the at least two urging parts elastically push against the convex edge of the optical element when the optical element is disposed in the fixing groove, so that a part of the convex edge of the optical element abuts against the abutting surface.

11. A projection device, comprising an illumination system, a light combining element, a light valve and a projection lens, and the light combining element comprising at least one optical element, at least two elastic members and a fixing base, wherein:
the fixing base is used for fixing the at least one optical element comprising an optical axis and for disposing the at least two elastic members, and the fixing base comprises a fixing groove and an elastic member fixing groove, wherein:
the fixing groove is configured to dispose the optical element, the fixing groove comprises a first end, a second end, and an abutting surface, and the fixing groove is formed by extending from the first end to the second end; and
the elastic member fixing groove is formed by extending from a first fixing end to a second fixing end; and
wherein each of the at least two elastic members comprises an urging part and a supporting part, the supporting part abuts against an inner surface of the elastic member fixing groove to provide the urging part with a push force toward the optical element, so that the optical element abuts against the abutting surface,
wherein an opening direction of the fixing groove and an opening direction of the elastic member fixing groove are nonparallel to a direction of the optical axis, and the at least two elastic members and the optical element are respectively disposed in the elastic member fixing groove and the fixing groove along a direction nonparallel to the direction of the optical axis,
wherein the illumination system is used for providing an illumination beam, the light combining element is disposed on a transmission path of the illumination beam so that the illumination beam passes through the light combining element, the light valve is used for forming an image beam, and the projection lens is disposed on a transmission path of the image beam.

12. The projection device according to claim 11, wherein when the at least two elastic members are disposed in the elastic member fixing groove, the at least two elastic members are partially disposed in the elastic member fixing groove and the supporting parts thereof respectively abut against inner surfaces of the first fixing end and the second fixing end of the elastic member fixing groove, thereby providing the urging part with the push force toward the optical element, so that the optical element abuts against the abutting surface.

13. The projection device according to claim 12, wherein the abutting surface is a curved surface and attaches and abuts against a surface of the optical element opposite to the at least two elastic members.

14. The projection device according to claim 13, wherein a connecting member is disposed between the at least two elastic members, the at least two elastic members and the connecting member are integrally formed, and the connecting member is disposed in the elastic member fixing groove.

15. The projection device according to claim 11, wherein the elastic member fixing groove further comprises a first fixing groove and a second fixing groove, the first fixing groove and the second fixing groove are respectively located at two end sides of the elastic member fixing groove, a quantity of the at least two elastic members is two, and the two elastic members are respectively disposed in the first fixing groove and the second fixing groove.

16. The projection device according to claim 11, wherein a connecting member is disposed between the at least two elastic members, the elastic member fixing groove further comprises a connecting groove, the connecting groove is disposed between the first fixing groove and the second fixing groove, and the connecting member is disposed in the connecting groove.

17. The projection device according to claim 11, wherein the fixing base further comprises a reference surface, the reference surface is perpendicular to the optical axis, a line connecting orthographic projection images of the urging parts of the at least two elastic members on the reference surface passes through a center of an orthographic projection image of the optical element on the reference surface.

18. The projection device according to claim 17, wherein a line connecting orthographic projection images of the first end and the second end on the reference surface passes through the center of the orthographic projection image of the optical element on the reference surface.

19. The projection device according to claim 11, wherein the at least two elastic members are evenly distributed in the elastic member fixing groove.

20. The projection device according to claim 11, wherein the optical element comprises a convex edge, and the at least two urging parts elastically push against the convex edge of the optical element when the optical element is disposed on the fixing groove, so that a part of the convex edge of the optical element abuts the abutting surface.

* * * * *